(No Model.)
P. W. MACKENZIE.
APPARATUS FOR THE MANUFACTURE OF FUEL AND ILLUMINATING GAS.
No. 418,648. Patented Dec. 31, 1889.
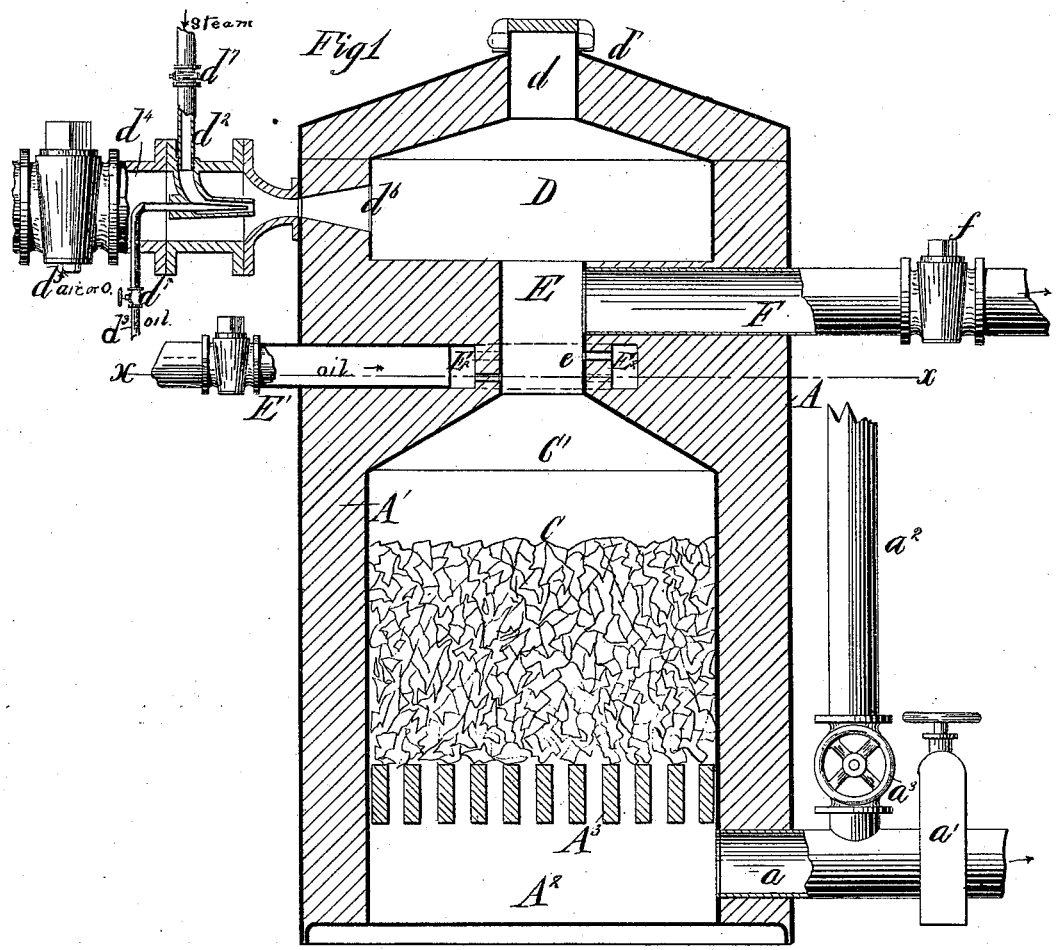
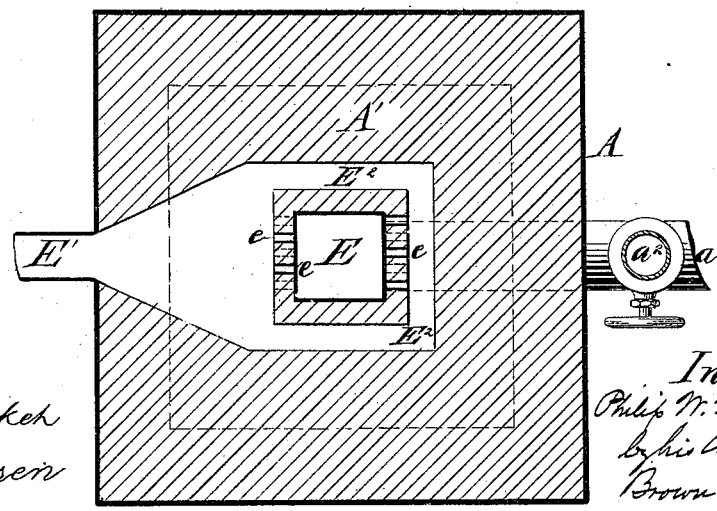
Witnesses:
John Bicker
O. Sundgren
Inventor:
Philip W. Mackenzie
by his Attorneys
Brown Griswold

UNITED STATES PATENT OFFICE.

PHILIP W. MACKENZIE, OF NEW YORK, N. Y., ASSIGNOR TO THE FUEL GAS AND LIGHT IMPROVEMENT COMPANY OF AMERICA, OF SAME PLACE.

APPARATUS FOR THE MANUFACTURE OF FUEL AND ILLUMINATING GASES.

SPECIFICATION forming part of Letters Patent No. 418,648, dated December 31, 1889.

Application filed June 4, 1889. Serial No. 313,081. (No model.)

*To all whom it may concern:*

Be it known that I, PHILIP W. MACKENZIE, of New York, in the county and State of New York, have invented a certain new and useful Improvement in Apparatus for the Manufacture of Fuel and Illuminating Gases, of which the following is a specification.

This invention relates to the manufacture of fuel-gas composed of hydrogen and carbonic oxide, and also illuminating-gas from the same apparatus and at the same time, which illuminating-gas is composed of hydrogen, carbonic oxide, marsh-gas, and carbon or illuminants, both of which gases are made of variable amounts of liquid hydrocarbon, water in the form of steam, and oxygen or air. Any desired portion of the fuel-gas for manufacturing and heating purposes may be delivered from the apparatus as required; or a required portion, after being carbureted and enriched by the addition of carbon, may be converted into a permanent illuminating-gas by the high initial heat obtained from the fuel-gas. All of these operations are completed in the same apparatus and at the same time without the use of retorts or their equivalent in the form of checker-work or similar heated surfaces. Hydrocarbon and steam may be supplied from a separate apparatus or not, as desired.

My improvement is particularly applicable for use in factories and other places where two kinds of gases are wanted.

In the accompanying drawings, Figure 1 is a vertical section of gas apparatus embodying my improvement. Fig. 2 is a horizontal section thereof, taken on the plane of the line $x$ $x$, Fig. 1.

Similar letters of reference designate corresponding parts in both figures.

A designates the shell or body of the apparatus, which shell or body is provided with a lining $A'$, of fire-brick or other suitable material of any desired thickness. In the lower portion of the body A is formed a chamber $A^2$, from which extends an outlet-pipe $a$, provided with a valve $a'$. Extending from the pipe $a$ is a stack $a^2$, provided with a valve or damper $a^3$. Above the chamber $A^2$ is a grating $A^3$, which may be supported in the lining $A'$. Upon the grating $A^3$, I place a mass of fragmentary refractory material C. This material may be fire-brick. Above the material C is a chamber $C'$.

D designates a converter or decomposing-chamber located in the upper portion of the shell or body of the apparatus. This converter is covered by a top or crown of sufficient thickness to prevent loss of heat by radiation, and is provided with an outlet $d$ upon its upper side, which may be closed by a cap or cover $d'$. Into the converter D, I inject a mixture of liquid hydrocarbon, superheated steam, and oxygen or air. I prefer to introduce this mixture by means of an injector comprising a pipe $d^2$, provided with a cock $d^7$. The steam is preferably superheated. With the injector communicates a pipe $a^3$, provided with a cock $d^8$, and through which the liquid hydrocarbon is drawn by the entering steam. At the same time oxygen or air in suitable quantities is drawn in through a pipe $d^4$, in which is a cock $d^5$. The mixing of the hydrocarbon, steam, and air or oxygen occurs outside the converter D, and enters the latter through an opening or tuyere $d^6$, in a thoroughly-mixed condition.

In starting the apparatus the cover $d'$ is raised and the mixed hydrocarbon, steam, and air or oxygen is ignited. When thoroughly ignited, the cover $d'$ is closed and combustion then takes place in the converter. The intensely-heated products of combustion pass downwardly through a contracted neck or passage E, forming a mixing-chamber and located about centrally in the bottom of the converter and communicating at its lower end with the chamber $C'$. At this time the valve $a'$ in the pipe $a$ is closed and the valve or damper $a^3$ in the stack $a^2$ is open. The products of combustion from the chamber $C'$ pass downwardly through the mass of refractory material C, thence into the chamber $A^2$, and thence out through the stack $a^2$. This preliminary operation is for the purpose of thoroughly heating the converter D and the refractory material C, and in carrying it out I prefer to use only a limited amount of steam and a certain amount of hydrocarbon.

$E'$ designates an inlet-pipe for the hydrocarbon, which may be either in a liquid form or vaporized, as desired. The hydrocarbon delivered through the inlet E' passes into a vapor-chamber $E^2$, which chamber surrounds the mixing-chamber E and communicates therewith through a number of passages or tuyeres $e$. The chambers E $E^2$ constitute in effect a carburetor and carbonizer.

F designates an outlet-pipe for gas to be used as fuel, which pipe is provided with a cock $f$, and opens at its inner end into the chamber E above the vapor-chamber $E^2$.

A proper degree of heat having been obtained, as previously described, I somewhat increase the supply of steam and liquid hydrocarbon to the chamber D. Hydrocarbon is also admitted through the pipe E' to the vapor-chamber $E^2$, and passes from thence through the passages $e$, in fine jets, into the mixing-chamber E, whereby the lean gas from the chamber D, which may pass downwardly through the mixing-chamber E, bebecomes enriched. In the converter D the oxygen or the oxygen of the air and steam combine with the carbon of the liquid hydrocarbon to produce combustion and decomposition, thereby liberating the hydrogen from the steam and hydrocarbon by decomposition, whereby carbonic acid and hydrogen are produced. Additional carbon or hydrocarbon admitted through the pipe $d^3$ absorbs the oxygen from the carbonic acid, thereby forming carbonic oxide. If this additional carbon or hydrocarbon were not thus introduced, however, the carbonic acid would be absorbed while the gas from the converter was passing through the mixing-chamber E, there producing the same result. The hydrocarbon from the vapor-chamber $E^2$, by being brought into atomized contact with the hydrogen and carbonic oxide when those gases are incandescent or at a very high temperature, undergoes destructive distillation and is converted into a permanent gas. The valve $a'$ in the pipe $a$ being opened and the valve or damper $a^3$ in the pipe $a^2$ being closed, such gas as passes downwardly into the chamber C' will then pass through the mass of highly-heated refractory material C into the chamber $A^2$, and thence out through the pipe $a$, to be used as illuminating-gas.

A portion of the gas from the chamber D may be carried off directly through the pipe F, to be used for fuel without being carbureted.

If it is desired only to use the gas for fuel, the valves $a'$ $a^3$ may be closed and the supply of hydrocarbon to the vapor-chamber cut off, and then all the gas may pass outwardly through the pipe F. If, on the other hand, it should be desired to use only illuminating-gas, it would be necessary only to close the cock in the pipe F.

If any carbon should remain unconverted, it may be condensed out by an ordinary condenser and used over again.

When nitrogen is present or produced—as when air is used—it is neutralized by the hydrocarbon.

The illuminating-gas after leaving the chamber $A^2$ is conveyed away to be washed, scrubbed, purified, and otherwise treated in the usual manner.

More than one injector for introducing hydrocarbon, steam, and oxygen or air to the chamber D may be used, if desired.

Although I have represented the apparatus as extending vertically, so that products of combustion pass downwardly, it might, of course, be arranged in other positions, and such products be otherwise directed.

What I claim as of my invention, and desire to secure by Letters Patent, is—

In a gas apparatus, the combination, with a shell or body, of a converter or decomposing-chamber near its upper end, a passage by which mixed hydrocarbon, steam, and air or oxygen is admitted to said converter or decomposing-chamber, a carburetor and carbonizer below said converter or decomposing-chamber, comprising a vapor-chamber for hydrocarbon and a mixing-chamber communicating therewith, a passage for the products of combustion from the converter or decomposing-chamber opening above the vapor-chamber, an inlet-pipe for hydrocarbon communicating with the vapor-chamber, loose refractory material below said carburetor and carbonizer through which the gas from the latter will pass downwardly, and an outlet-pipe for the gas below said refractory material, substantially as specified.

PHILIP W. MACKENZIE.

Witnesses:
ALBT. VAN DYKE,
GEORGE A. BAKER.